United States Patent

Muramatsu

[11] Patent Number: 5,866,052
[45] Date of Patent: Feb. 2, 1999

[54] PROCESS OF MANUFACTURING STRUCTURAL BODY FOR AUTOMOTIVE VEHICLE

[75] Inventor: Atsushi Muramatsu, Komaki, Japan

[73] Assignee: Tokai Rubber Industries, Ltd., Japan

[21] Appl. No.: 802,101

[22] Filed: Feb. 19, 1997

[30] Foreign Application Priority Data

Feb. 19, 1996 [JP] Japan .................................. 8-030688

[51] Int. Cl.$^6$ ............................ B29C 44/06; B29C 44/18
[52] U.S. Cl. .......................................... 264/46.6; 264/46.4
[58] Field of Search .................... 264/46.6, 46.4

[56] References Cited

U.S. PATENT DOCUMENTS

| | | | |
|---|---|---|---|
| 4,269,890 | 5/1981 | Breitling et al. | 264/45.2 |
| 4,995,545 | 2/1991 | Wycech | 264/46.7 |
| 5,160,465 | 11/1992 | Soderberg | 264/46.5 |

FOREIGN PATENT DOCUMENTS

| | | | |
|---|---|---|---|
| 59-214628 | 12/1984 | Japan | 264/46.6 |
| 61-53030 | 3/1986 | Japan | 264/46.4 |
| 61-116509 | 6/1986 | Japan | 264/46.6 |
| 1-135965 | 5/1989 | Japan . | |
| 1-164641 | 6/1989 | Japan . | |
| 1-166939 | 6/1989 | Japan . | |
| 2-102035 | 4/1990 | Japan . | |
| 3-269080 | 11/1991 | Japan | 264/46.6 |
| 6-330021 | 11/1994 | Japan . | |
| 8-198995 | 8/1996 | Japan . | |

*Primary Examiner*—Allan R. Kuhns
*Attorney, Agent, or Firm*—Parkhurst & Wendel

[57] ABSTRACT

A process of manufacturing a structural body for an automotive vehicle, the structural body comprising a hollow member having an inner space, and a foamed body filling the inner space, the process including the steps of disposing, in the inner space of the hollow member, a hard foamable material having expansion absorbing means, the expansion absorbing means being formed in a longitudinal direction of the hollow member; and foaming the hard foamable material into a highly rigid foamed body for filling the inner space of the hollow member, such that the expansion absorbing means absorbs volume expansion of the highly rigid foamed body so as to prevent application of an excessive foaming pressure generated by the highly rigid foamed body, to inner surfaces of the hollow member.

10 Claims, 6 Drawing Sheets

PROCESS OF MANUFACTURING STRUCTURAL BODY FOR AUTOMOTIVE VEHICLE

BACKGROUND OF THE INVENTION

1. Field of the Art

The present invention relates to a process of manufacturing a structural body for an automotive vehicle. More particularly, the invention is concerned with the process of manufacturing the structural body having a high degree of rigidity, without suffering from deformation or distortion of the body.

2. Discussion of the Related Art

In general, a hollow or tubular member used as a front pillar or a center pillar of an automotive vehicle has an enclosed inner space. The wind may pass through the inner space, thereby causing wind noise. Further, the vibration noise of the engine may be transmitted from the engine room to the interior of the vehicle through the inner space of the hollow member. Thus, the inner space in the hollow member undesirably leads to generation of noise in the interior of the vehicle. Conventionally, to deal with the above problem, the inner space in the hollow member is filled with a foamed body for preventing the wind from passing through the inner space and inhibiting the transmission of the vibration noise to the interior of the vehicle, so as to improve the sound insulation characteristics of the vehicle.

In recent years, the hollow member is filled with the foamed body in an attempt to increase the rigidity of the structural body of the vehicle such as pillars, and to improve the amount of absorption of energy generated upon collision of the vehicle, while at the same time meeting other demands, such as reduction of the weight of the vehicle and cost of its manufacture, as well as reduction of the noise conventionally generated in the interior of the vehicle. In view of the above, the hollow member is usually filled with a highly rigid or high-rigid foamed body which is obtained by foaming a hard foamable material. In the specification, the hard foamable material means a foamable material to form a highly rigid foam.

There are various known methods for filling the inner space in the pillar member with the foamed body. For example, the inner space is filled with a foamed body by inserting the foamed body having a configuration corresponding to that of the inner space, through an opening formed through the hollow member. Alternatively, a foamable material which is capable of foaming and expanding upon heating is disposed in the inner space as a spot sealing member, and is foamed by heat generated in the process of manufacture of the pillar member. For instance, the foamable material is foamed to fill the inner space, in a furnace in which the pillar member is baked for electro-deposition coating. When the inner space is filled with the foamed body according to the former method as described above, the foamed body having the same configuration as the inner space is inserted into the inner space through the opening of the pillar member. In this case, it is difficult to completely and uniformly fill the entire space in the pillar member with the foamed body, without an air gap adjacent to the inner surfaces of the pillar member. Moreover, since the opening through which the foamed body is inserted is formed by punching out a portion of a steel plate which constitutes a part of the pillar member, the worker may have his hand injured by contact with the edge portion of the opening formed by punching, upon inserting the foamed body through the opening.

When the inner space is filled with the foamed body obtained by foaming a foamable material, in particular, a hard foamable material, according to the latter method as described above, an excessively high degree of foaming pressure is likely to act on the steel plates which form the hollow member in the process steps of foaming and curing of the foamable material, whereby the steel plates undesirably tend to be deformed. More specifically described by reference to FIGS. 1(a)–1(c), when the hollow member is filled with the hard foamable material, a hard foamable material 4 having a rectangular cross sectional shape is initially disposed in the inner space of the hollow member in the form of a pillar 2, such that the foamable material 4 is fixed to the pillar 2, as shown in FIG. 1(a). Then, the hard foamable material 4 is heated for foaming, whereby the hard foamable material 4 expands in the inner space of the pillar 2 so as to completely fill the entire inner space, as shown in FIG. 1(b). If the foaming of the hard foamable material 4 proceeds, the hard foamable material 4 continues to expand in the inner space of the pillar 2. It is noted that the hard foamable material 4 has a high degree of expansion or foaming ratio, so as to expand to such an extent that the foamable material 4 completely fills the inner space of the pillar 2 when it is foamed. Accordingly, if the foaming process of the foamable material 4 continues even after the inner space of the pillar 2 has been filled with the expanded foamable material 4, the foamable material 4 is prevented from further expanding within the inner space of the pillar 2. In this case, the foaming pressure of the foamable material 4, i.e., an expansion force of the foamable material 4, acts on the inner surfaces of the pillar 2 to an excessive extent in the directions indicated by arrows in FIG. 1(b). Thus, the steel plates which form the pillar 2 may be undesirably deformed, resulting in deformation of a structural body 8 as shown in FIG. 1(c) which is filled with a highly rigid foamed body 6 obtained by foaming and curing of the hard foamable material 4.

Since the conventional foamable material generally takes the form of a sheet-like member having a relatively large thickness as shown in FIG. 1(a), this foamable material cannot be heated uniformly, namely, the heating temperature may considerably differ at its outer surfaces and at its inner or center portions. Thus, the conventional foamable material is less likely to be foamed with high stability. That is, the hollow member cannot be sufficiently filled with the highly rigid foamed body. Namely, some local portions of the foamable material may not be fully foamed due to insufficient heating. If the expansion ratio of the foamable material is raised in an attempt to eliminate the above drawback, the inner space of the hollow member can be completely filled with the highly rigid foamed body. On the other hand, however, the foaming pressure undesirably tends to be excessive, whereby the structural body 8 obtained is likely to be deformed as described above.

SUMMARY OF THE INVENTION

It is therefore an object of the present invention to provide a process of manufacturing a structural body for an automotive vehicle, which permits the structural body to be filled with a hard foamable material, and which prevents application of an excessive foaming pressure to a member of the structural body upon foaming of the hard foamable material, while assuring high stability of foaming and curing of the hard foamable material so as to avoid the deformation of the structural body.

The above object may be attained according to a principle of the present invention which provides a process of manufacturing a structural body for an automotive vehicle, the structural body comprising a hollow member having an inner space, and a foamed body filling the inner space, the process comprising the steps of: disposing, in the inner space of the hollow member, a hard foamable material having expansion absorbing means, the expansion absorbing means being formed in a longitudinal direction of the hollow member; and foaming the hard foamable material into a highly rigid foamed body for filling the inner space of the hollow member, such that the expansion absorbing means absorbs volume expansion of the highly rigid foamed body so as to prevent application of an excessive foaming pressure generated by the highly rigid foamed body, to inner surfaces of the hollow member.

According to the present process of manufacturing of the structural body for the automotive vehicle as described above, the hard foamable material used for filling the inner space of the hollow member has the expansion absorbing means. Accordingly, the structural body is advantageously obtained without suffering from deformation when the inner space of the hollow member is filled with the highly rigid foamed body obtained by foaming and hardening the hard foamable member.

Described more specifically, the foaming pressure generated when the hard foamable material is foamed into a foamed body for filling the inner space of the hollow member is usually made sufficiently high such that the inner space of the hollow member is completely filled with the foamed body obtained by foaming the hard foamable material. In this case, the hard foamable material continues to further expand even after the inner space of the hollow member is filled with the foamed body, and therefore, the expansion force of the hard foamable material, in other words, an excessive degree of the foaming pressure undesirably remains within the inner space of the hollow member. However, the hard foamable material according to the present invention has the expansion absorbing means which is easily deformed upon receiving an external pressure, to thereby accommodate the further volume expansion of the hard foamable material. According to this arrangement, the excessive foaming pressure remaining within the hollow member is absorbed by deformation of the expansion absorbing means of the hard foamable material, to thereby prevent application of the excessive foaming pressure to the inner surfaces of the hollow member.

Owing to the presence of the expansion absorbing means as described above, the thickness of the hard foamable material is smaller than that of a hard foamable material without such expansion absorbing means. Alternatively, the hard foamable material has a larger surface area due to the presence of the expansion absorbing means, as compared with the hard foamable material which does not have the expansion absorbing means. Accordingly, the hard foamable material of the present invention can be uniformly heated so that it is foamed and cured with high stability.

According to one preferred form of the present invention, the expansion absorbing means comprises means for defining a cavity formed within the hard foamable material. Since the expansion absorbing means in the form of the cavity is likely to be deformed, it is capable of effectively absorbing the foaming pressure applied thereto. In addition, the presence of the expansion absorbing means in the form of the cavity contributes to substantial reduction of the thickness of the hard foamable material, so that the hard foamable material can be uniformly heated even at its central portion. Alternatively, the presence of the expansion absorbing means leads to an increase in the surface area of the hard foamable material, i.e., an increase in the area for absorbing heat applied for foaming the foamable material. Thus, the hard foamable material is uniformly foamed so as to effectively assure stable foaming and curing thereof.

According to another preferred form of the present invention, the expansion absorbing means comprises a soft material which is softer than the highly rigid foamed body, and a volume of which is reduced upon application of an external compression force thereto. In this arrangement, the soft material fills a portion of the inner space of the hollow member where the highly rigid foamed body is not filled, to thereby completely fill the inner space of the obtained structural body.

BRIEF DESCRIPTION OF THE DRAWINGS

The above and optional objects, features and advantages of the present invention will be better understood by reading the following detailed description of preferred embodiments of the invention, when considered in connection with the accompanying drawings, in which.

DETAILED DESCRIPTION OF THE PREFERRED EMBODIMENTS

Figure 1A:
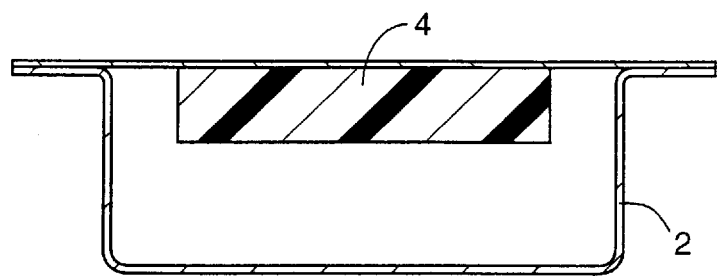
FIG. 1(a) is a view explaining the first step of a conventional process of manufacturing a structural body for an automobile, wherein a hard foamable material before foaming is disposed in an inner space of a pillar of the automobile.
Figure 1B:
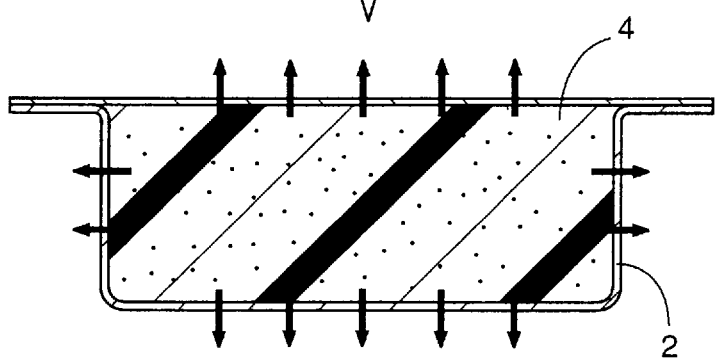
FIG. 1(b) is a view explaining the second step of the conventional process of manufacturing the structural body, wherein the hard foamable material is foamed.
Figure 1C:
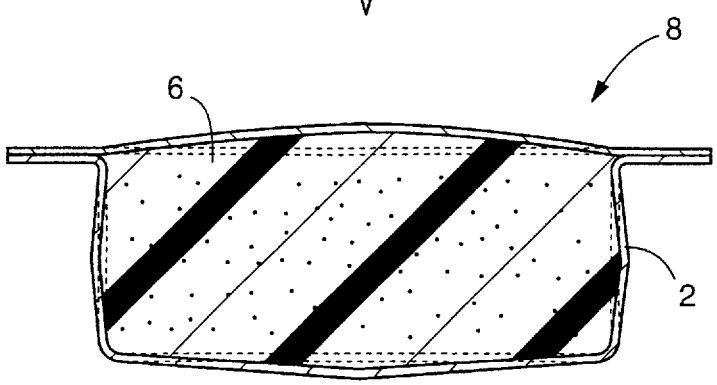
FIG. 1(c) is a view explaining the third step of the conventional process for manufacturing the structural body, wherein the hard foamable material has been foamed and cured.
Figure 2A:
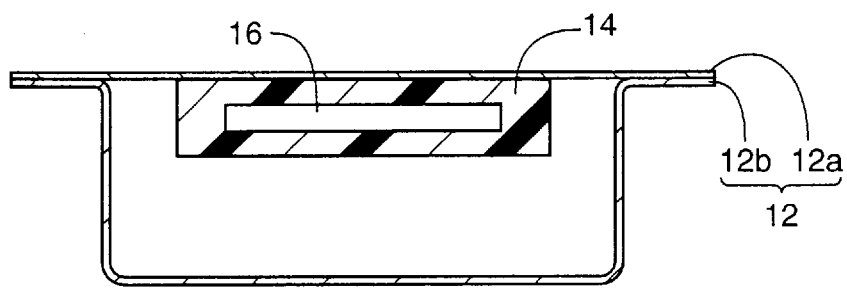
FIGS. 2(a) through 2(c) are views corresponding to those of FIGS. 1(a)–1(c), explaining process steps for manufacturing a structural body for an automobile by using a hard foamable material, according to the present invention.
Figure 2B:
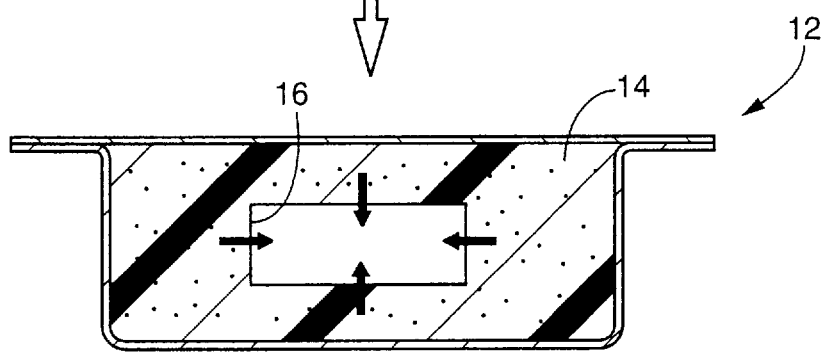
Figure 2C:
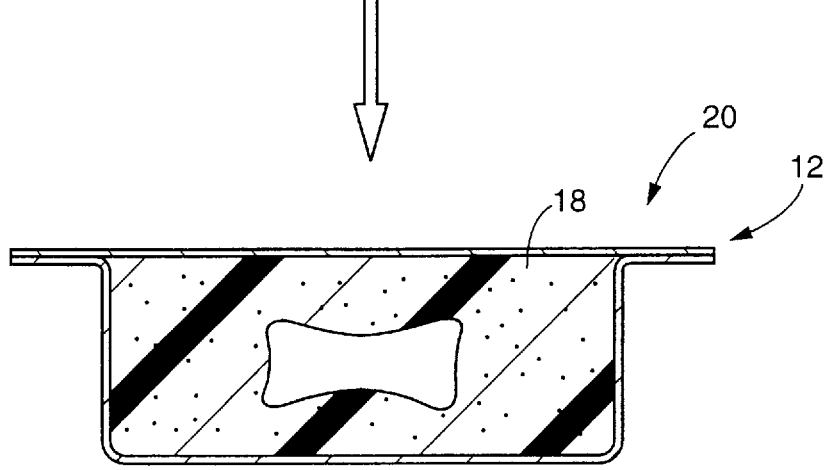

Referring first to FIGS. 2(a) through 2(c), there is schematically shown a process of manufacturing a structural body for an automotive vehicle according to a first embodiment of the present invention. The reference numeral 12 in FIG. 2(a) denotes a pillar of the vehicle which extends in a direction perpendicular to the plane of the view of FIG. 2(a). In this pillar 12, there is disposed a hard foamable material 14 before foaming, such that the foamable material 14 is fixed to the pillar 12. FIG. 2(b) shows the pillar 12 whose inner space is filled with the hard foamable material 14 which is under foaming by heating the pillar 12. In FIG. 2(*c*), the foaming and curing of the hard foamable material 14 has been finished.

Described more specifically, the pillar 12 as shown in FIG. 2(*a*) consists of a sheet-like steel plate 12*a* and a steel plate 12*b* having a hat-shaped transverse cross sectional shape. The two steel plates 12*a* and 12*b* are held in an abutting contact and bonded to each other as shown in FIG. 2(*a*), thereby forming a hollow member in the form of the pillar 12 having an enclosed inner space. This pillar 12 extends in the direction perpendicular to the plane of the view of FIG. 2(*a*). In this enclosed inner space of the pillar 12, the hard foamable material 14 before foaming is disposed, such that the foamable-material 14 is fixed to the sheet-like steel plate 12*a*. This hard foamable material 14 has a flat, rectangular cross sectional shape, and extends in the longitudinal direction of the pillar 12. The hard foamable material 14 has a cavity 16 serving as expansion absorbing means, which is located at its central portion as seen in the transverse cross section. The cavity 16 has a rectangular cross sectional shape as shown in FIG. 2(*a*), and extends continuously in the longitudinal direction of the hard foamable material 14.

The hard foamable material 14 is suitably selected from various known foamable materials, provided that the foamable material is capable of giving sufficiently high rigidity to the structural body of the vehicle to be obtained. In general, the foamable material preferably has an expansion ratio of not smaller than 2. Further, a foamed body obtained by foaming and curing of the foamable material preferably has a modulus of elasticity not smaller than 1 kN/mm. Examples of the foamable material are a hard polyurethane foamable material, a hard epoxy resin foamable material and a hard rubber foamable material. The above-described modulus of elasticity of the foamed body is obtained as follows. Initially, there is obtained a relationship between an amount of displacement of the foamed body when two opposed surfaces of the foamed body are compressed and deformed toward each other, and a compressive load applied to the opposed surfaces of the foamed body. The modulus of elasticity is represented by a gradient of a line representing the relationship during the initial period of deformation of the foamed body. In other words, the modulus of elasticity of the foamed body means a value obtained by dividing an amount of change of the compressive load applied to the foamed body by an amount of change of the displacement of the foamed body. The expansion ratio as described above means a value obtained by dividing the thickness of the foamed body to be obtained by the thickness of the foamable material.

The cross sectional shape of the cavity 16 as the expansion absorbing means is not limited to the rectangular shape as shown in FIG. 2(*a*), but may be suitably selected depending upon the cross sectional shape of the inner space of the hollow member in the form of the pillar 12. For instance, the cross sectional shape of the cavity 16 may be circle, elliptical or polygonal. In general, the cavity 16 is formed concurrently when the hard foamable material 14 is formed by extrusion.

The pillar 12 in which the above-described hard foamable material 14 is disposed is heated for foaming the foamable material 14. As shown in FIG. 2(*b*), the hard foamable material 14 is foamed and expanded so as to completely fill the entire inner space of the pillar 12. If the foaming process of the hard foamable material 14 proceeds under this condition, the hard foamable material 14 would further expand. However, since the hard foamable material 14 has expanded to such a full extent that the inner space of the pillar 12 is completely filled, the foamable material 14 is prevented from further expanding in the outer direction of the foamed body, whereby an excessive degree of foaming pressure is caused in the pillar 12. The hard foamable material 14 according to the present embodiment has the cavity 16 which is easily deformed upon receiving an external pressure. Accordingly, the excessive foaming pressure does not act in directions toward the rigid steel plates (12*a*, 12*b*), but acts inwardly as indicated by arrows in FIG. 2(*b*), namely, in directions toward the cavity 16 which is easily deformed as described above. In this arrangement, the excessive foaming pressure acts on the cavity 16, whereby the cavity 16 is deformed and its volume is accordingly reduced, so as to accommodate further volume expansion of the hard foamable material. Thus, the cavity 16 serving as the expansion absorbing means absorbs volume expansion of the hard foamable material so as to prevent application of the excessive foaming pressure generated by the hard foamable material to the inner surfaces of the pillar 12.

Since the hard foamable material 14 is foamed and cured while preventing the application of the excessive foaming pressure to the inner surfaces of the pillar 12, the obtained structural body 20 for the vehicle is not deformed. The structural body 20 is filled with a highly rigid foamed body 18 as shown in FIG. 2(*c*).

The heating condition for foaming and curing the hard foamable material 14 is suitably determined depending upon the hard foamable material to be used and the characteristic of the structural body to be obtained. In general, the hard foamable material 14 is heated at about 160° C. to 210° C. for about 15 to 30 minutes. Since this heating condition is employed during the manufacturing process of the structural body, the hard foamable material 14 is foamed by utilizing heat treatment effected during the manufacturing process of the structural body. For example, in the process of producing the structural body for the vehicle, the structural body is usually subjected to various process steps such as welding, degreasing, cleaning or washing, and electro-deposition coating. Following these steps, a step of baking the electro-deposition coating of the structural body is effected, during which the hard foamable material 14 is heated so that it is foamed and cured without any exclusive step for heating the hard foamable material 14.

In the present embodiment, the pillar of the vehicle is illustrated as the hollow member which has an enclosed inner space and which serves as a structural body of the vehicle. However, the principle of the invention is advantageously applicable to other types of hollow member having the enclosed inner space, such as a rocker, a side member or a cross member, and a beam used in the vehicle.

Figure 3:
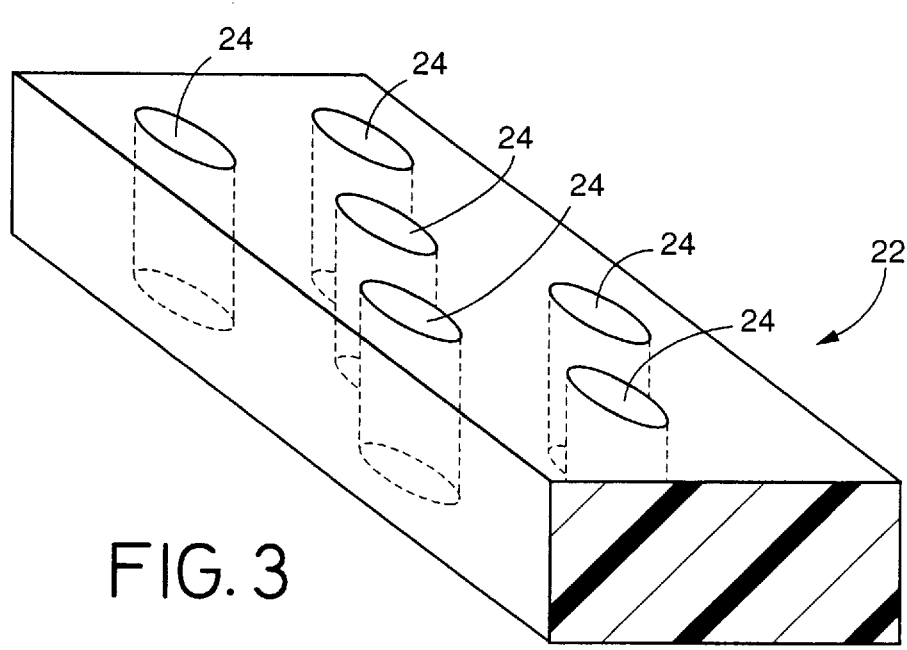
FIG. 3 is a view showing one example of the hard foamable material used in the process steps of FIGS. 2(a)–2(c)

The configuration of the expansion absorbing means of the hard foamable material used in the present embodiment is not limited to the cavity 16 as shown in FIG. 2(*a*), but various other configurations are suitably selected as long as the expansion absorbing means is capable of absorbing volume expansion of the hard foamable material. For instance, the expansion absorbing means may take form of a plurality of through-hole 24 as shown in FIG. 3, each of which is formed through the thickness of a hard foamable material 22. When the hard foamable material 22 of FIG. 3 is disposed in the pillar 12 and is foamed by heating, in a similar manner as described above with respect to the hard foamable material 14, the plurality of through-holes 24 functioning as the expansion absorbing means are likely to be deformed so as to accommodate further volume expansion of the hard foamable material 22, to thereby prevent application of the excessive foaming pressure to the inner surfaces of the pillar 12, as in the above-described embodiment of FIGS. 2(a)–2(c). This arrangement is advantageous in that the heat applied to the hard foamable material 22 for foaming thereof can be transmitted to its inner or center portion via the plurality of through-holes 24 serving as the expansion absorbing means, whereby the foamable material 22 can be heated uniformly, and foamed and cured with high stability.

Figure 4:
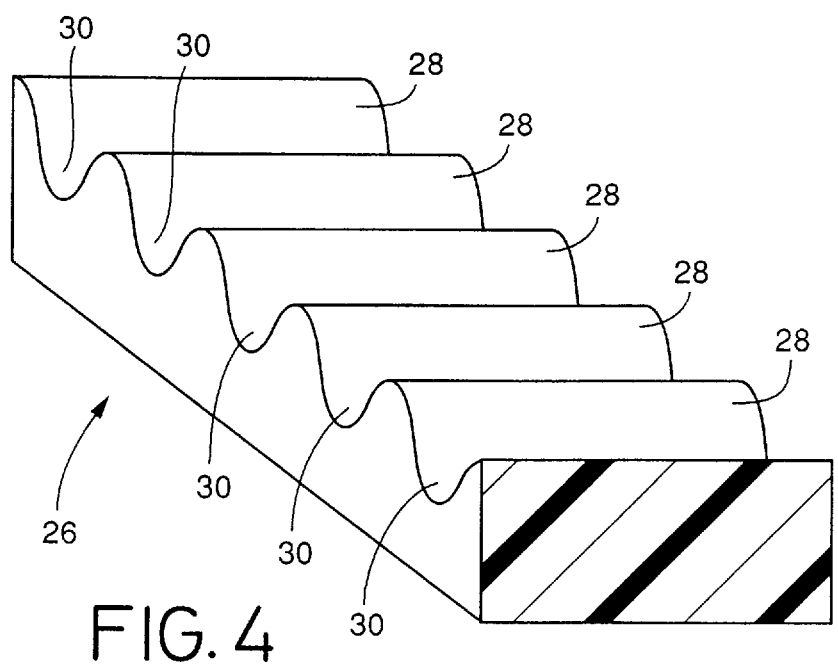
FIG. 4 is a view showing another example of the hard foamable material used in the process steps of FIGS. 2(a)–2(c)

Referring next to FIG. 4, there is shown a hard foamable material 26 having another type of the expansion absorbing means. Described more specifically, the hard foamable material 26 has a plurality of protrusions 28 and a plurality of recesses 30. Each of the protrusions 28 and each of the recesses 30 extend in the lateral or width direction of the hard foamable material 26, and are formed alternately with each other in the longitudinal direction of the foamable material 26, so as to provide a corrugated shape as shown in FIG. 4. In this arrangement, the recesses 30 function as the expansion absorbing means. When the hard foamable material 26 is disposed in the pillar 12 and is foamed by heating in the same manner as in the embodiment of FIGS. 2(a)–2(c), the recesses 30 functioning as the expansion absorbing means are capable of absorbing the volume expansion of the hard foamable material 26, thereby preventing application of the excessive foaming pressure generated in the process steps of foaming of the foamable material 26 to the inner surfaces of the pillar 12. According to this arrangement, the hard foamable material 26 has an increased surface area owing to the presence of the protrusions 28 and the recesses 30 formed as described above, so that the hard foamable material 26 can be heated uniformly, and foamed and cured with high stability.

Figure 5:
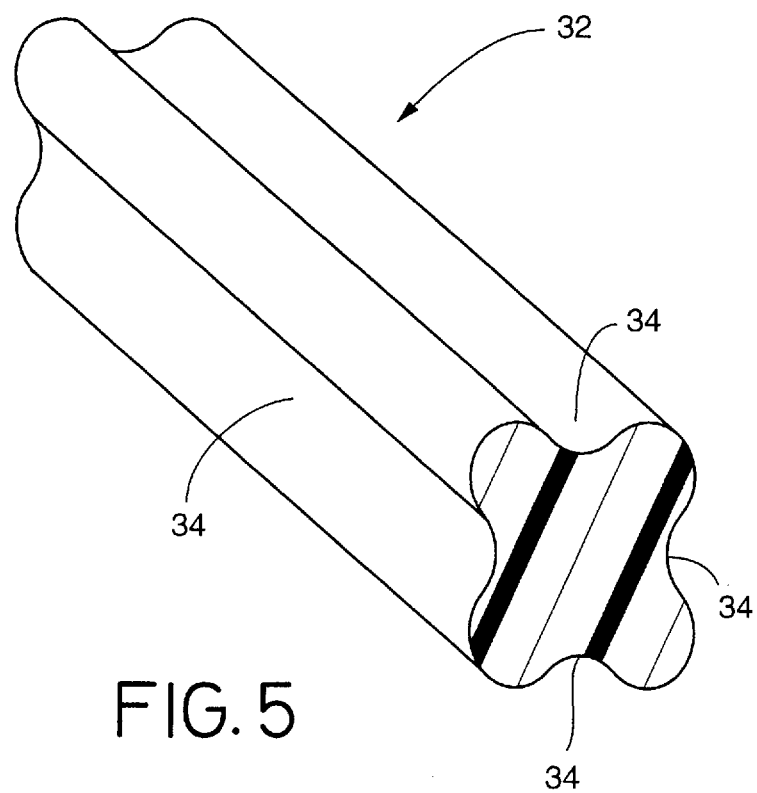
FIG. 5 is a view showing still another example of the hard foamable material used in the process steps of FIGS. 2(a)–2(c)

FIG. 5 shows a hard foamable material 32 having still another type of the expansion absorbing means. Described in detail, the hard foamable material 32 of FIG. 5 has four recesses 34 as the expansion absorbing means. Namely, the hard foamable material 32 is a square prism which has a substantially rectangular transverse cross sectional shape and whose four corners are rounded. Each of the four recesses 34 is formed between the adjacent rounded portions of the square prism. The recesses 34 functioning as the expansion absorbing means continuously extend in the longitudinal direction of the hard foamable material 32. When this hard foamable material 32 is disposed in the pillar 12 and is foamed by heating as in the embodiment of FIGS. 2(a)–2(c), the recesses 34 are capable of absorbing volume expansion of the hard foamable material 32, thereby effectively preventing the excessive foaming pressure. In this arrangement, too, the hard foamable material 32 can be heated uniformly due to the existence of the recesses 34 each extending in the longitudinal direction of the hard foamable material 32 and functioning as the expansion absorbing means.

Like the hard foamable material 14 of the embodiment of FIGS. 2(a)–2(c), the hard foamable material 22, 26, 32 as shown in FIGS. 3, 4, 5, respectively, can be easily obtained according to a known manner, such as extrusion.

Referring next to FIG. 6, there is schematically shown a process of manufacturing the structural body for the automotive vehicle according to a second embodiment of the present invention. Though the expansion absorbing means which have been described is provided by a void or voids (16, 24, 30, 34) formed in the respective hard foamable materials 14, 22, 26, 32, the expansion absorbing means of the hard foamable material used in this embodiment is formed of a soft foamable material.

Figure 6A:
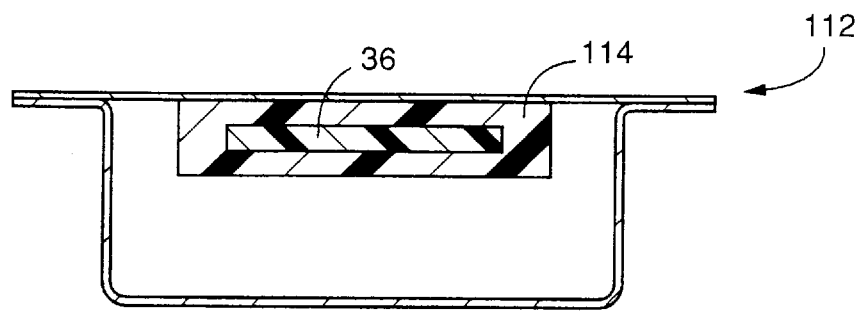
FIGS. 6(a) through 6(c) are views corresponding to those of FIGS. 1(a)–1(c), explaining another process steps for manufacturing the structural body for the automobile according to the present invention.
Figure 6B:
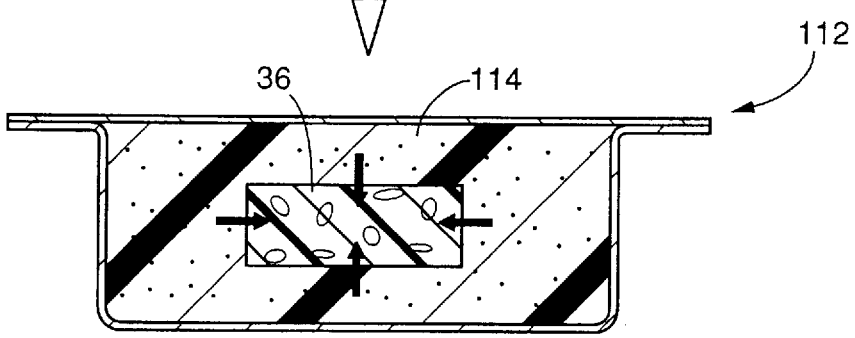
Figure 6C:
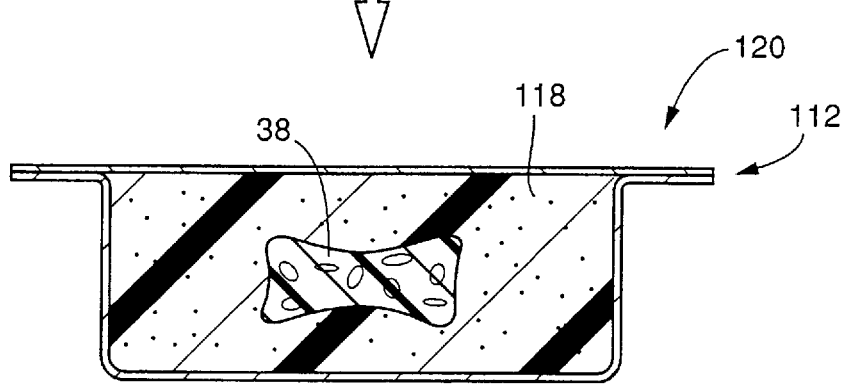

Referring to FIG. 6(a), there is shown a pillar 112 in which a hard foamable material 114 is disposed such that the foamable material 114 is fixed to the pillar 112. In this hard foamable material 114, there is embedded a soft foamable material 36 which functions as the expansion absorbing means. The hard foamable material 114 is foamed by heating the pillar 112, so as to fill the inner space of the pillar 112 as shown in FIG. 6(b). In this condition, the soft foamable material 36 is foamed as well as the hard foamable material 114, thereby filling the substantially entire inner space of the pillar 112. As the foaming process of the hard foamable material 114 proceeds, the foaming pressure of the hard foamable material 114 becomes excessive. However, in the present embodiment, the soft foamable material 36 as the expansion absorbing means is foamed into a soft foamed body 38. The soft foamed body 38 is compressed and deformed as shown in FIG. 6(c) upon receiving the foaming pressure. Like the expansion absorbing means 16, 24, 30, 34 as described above, the soft foamable material 36 functioning as the expansion absorbing means is capable of effectively accommodating the volume expansion of the hard foamable material 114, to thereby prevent application of the excessive foaming pressure to the inner surfaces of the pillar 112. Thus, according to the present embodiment, the structural body 120 which is filled with the highly rigid foamed body 118 can be obtained without suffering from the conventionally experienced deformation of of the pillar 112.

Since the soft foamable material 36 is foamed into the soft foamed body 38, the obtained structural body 120 is completely filled with the highly rigid foamed body 118 and the soft foamed body 38, as shown in FIG. 6(c). This arrangement effectively prevents the generation of wind noise and the transmission of the vibration noise to the interior of the vehicle, so as to advantageously assure improved sound insulation characteristics of the vehicle.

The soft foamable material 36 functioning as the expansion absorbing means in the present embodiment may have various cross sectional shapes, such as a circle, an elliptical, and a polygonal cross sectional shape. The present hard foamable material 114 in which the soft foamable material 36 is embedded can be easily obtained by extruding the soft foamable material 36 concurrently with the hard foamable material 114.

The soft material according to the present invention is not limited to the soft foamable material of the illustrated embodiment. Namely, the soft material is capable of absorbing the excessive foaming pressure generated upon foaming of the hard foamable material. As compared with the steel plates which form the structural body such as the pillar, the soft material is likely to be deformed, and therefore, its volume is easily reduced upon application of an external compressive force thereto. The soft material may be selected from various known materials. Examples of the soft material are a foamable material such as a soft polyurethane foamable material or a soft rubber foamable material, a foamed body obtained by foaming such a foamable material, and a fiber material such as a felt.

Figure 7:
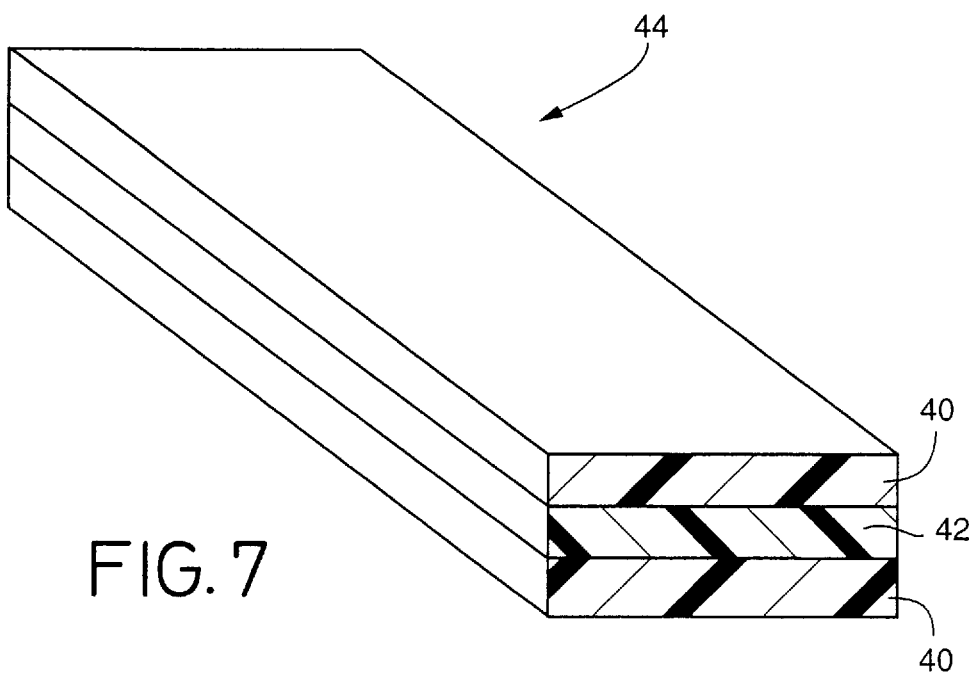
FIG. 7 is a view showing one example of the hard foamable material used in the process steps of FIGS. 6(a)–6(c).

The configuration of the hard foamable material which has the expansion absorbing means formed of the soft material is not limited to that of the hard foamable material 114 as shown in FIG. 6(a). For instance, a hard foamable material 44 as shown in FIG. 7 may be suitably used. The hard foamable material 44 consists of an upper and a lower hard foamable sheet 40, 40 and a soft foamable sheet 42 sandwiched by and between the lower and upper hard foamable sheets 40, 40. The soft foamable sheet 42 serves as the expansion absorbing means. These hard foamable sheets 40, 40 and the soft foamable sheet 42 are bonded with each other to provide the hard foamable material 44 as shown in FIG. 7. Like the soft foamable material 36 of FIGS. 6(a)–6(c), the soft foamable sheet 42 is easily deformed upon receiving the excessive foaming pressure generated in the process step of foaming of the hard foamable sheets 40, thereby preventing application of the excessive foaming pressure to the inner surfaces of the pillar 12. In this arrangement, since the hard foamable sheets 40 have a comparatively small thickness, the hard foamable sheets 40 can be heated uniformly, so that it is foamed and cured with high stability.

As can be understood from the above description, according to the present process of manufacturing the structural body for the automotive vehicle, when the hollow member which gives the structural body is filled with the hard foamable material, the excessive foaming pressure generated by the hard foamable material is not applied to the hollow member. Moreover, the hard foamable material can be foamed and cured with high stability. Accordingly, the structural body for the automobile is effectively produced without suffering from deformation. Further, the structural body for the automobile produced according to the present invention has a high-degree of rigidity, leading to reduction of the vibration and noise, and improvement of safety characteristics upon collision of the vehicle, while assuring reduced weight of the vehicle and lowered cost of its manufacture.

It is to be understood that the present invention may be embodied with other changes, modifications and improvements, which may occur to those skilled in the art without departing from the spirit and scope of the invention defined in the following claims.

What is claimed is:

1. A process of manufacturing a structural body for an automotive vehicle, said structural body comprising a hollow member having an inner space, and a foamed body filling said inner space, said process comprising the steps of:

disposing, in said inner space of said hollow member, a solid hard foamable material having predetermined outer dimensions and expansion absorbing means, said expansion absorbing means being formed in a longitudinal direction of said hollow member, and selected from the group consisting of a cavity formed within said hard foamable material, a plurality of through-holes formed through the thickness of said hard foamable material, a plurality of recesses extending in a lateral direction of said hard foamable material, and a soft material that is softer than a highly rigid foamed body, a volume of said soft material being reduced upon application of an external compressive force thereto; and foaming said hard foamable material into said highly rigid foamed body for filling said inner space of said hollow member, such that said expansion absorbing means absorbs volume expansion of said highly rigid foamed body so as to prevent application to inner surfaces of said hollow member of an excessive foaming pressure generated by said highly rigid foamed body.

2. A process according to claim 1, wherein said hard foamable material is heated for foaming at a temperature between 160° C.–210° C. for 15 to 30 minutes.

3. A process according to claim 1, wherein said hard foamable material is selected from the group consisting of a hard polyurethane foamable material, a hard epoxy resin foamable material and a hard rubber foamable material.

4. A process according to claim 1, wherein said hard foamable material has an expansion ratio not smaller than 2.

5. A process according to claim 1, wherein said highly rigid foamed body has a modulus of elasticity not smaller than 1 kN/mm.

6. A process according to claim 1, wherein said expansion absorbing means is formed concurrently when said hard foamable material is formed by extrusion.

7. A process according to claim 1, wherein said soft material of said expansion absorbing portion is selected from the group consisting of: a soft foamable material; a foamed body obtained by foaming said soft foamable material; and a fiber material.

8. A process according to claim 7, wherein said soft foamable material is a soft polyurethane foamable material.

9. A process according to claim 7, wherein said soft foamable material is a soft rubber foamable material.

10. A process according to claim 7, wherein said fiber material is a felt.

* * * * *